United States Patent
Kudo et al.

(10) Patent No.: US 7,267,757 B2
(45) Date of Patent: Sep. 11, 2007

(54) MAGNETIC HEAD UTILIZING A CONIFE ALLOY WITH 60-80 WEIGHT PERCENT FE AND METHOD FOR PRODUCTION THEREFOR

(75) Inventors: Kazue Kudo, Fujisawa (JP); Gen Oikawa, Fujisawa (JP); Tetsuya Okai, Fujisawa (JP); Ichiro Oodake, Fujisawa (JP); Hiromi Shiina, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

(21) Appl. No.: 10/665,910

(22) Filed: Sep. 18, 2003

(65) Prior Publication Data

US 2004/0101712 A1 May 27, 2004

(30) Foreign Application Priority Data

Nov. 1, 2002 (JP) .............................. 2002-319434

(51) Int. Cl.
*C25C 1/08* (2006.01)
*G11B 5/127* (2006.01)

(52) U.S. Cl. .................. 205/596; 205/119; 205/259; 420/119; 420/129; 428/812; 360/125

(58) Field of Classification Search ............... 360/317, 360/324.1, 324.11, 324.12, 323; 428/692; 205/596
See application file for complete search history.

(56) References Cited

U.S. PATENT DOCUMENTS

| | | | | |
|---|---|---|---|---|
| 4,129,482 A | * | 12/1978 | Lash | ........................... 205/260 |
| 4,661,216 A | * | 4/1987 | Anderson et al. | ........... 205/260 |
| 5,011,581 A | * | 4/1991 | Omata | ........................ 205/184 |
| 6,033,580 A | * | 3/2000 | Shouji et al. | ................. 216/22 |
| 6,337,007 B1 | * | 1/2002 | Osaka | ......................... 205/255 |
| 6,507,464 B1 | * | 1/2003 | Ohashi et al. | .............. 360/317 |
| 6,714,380 B2 | | 3/2004 | Kawasaki et al. | |
| 6,776,891 B2 | * | 8/2004 | Chen et al. | .................... 205/89 |
| 2003/0085131 A1 | * | 5/2003 | Li et al. | ...................... 205/259 |
| 2003/0188422 A1 | * | 10/2003 | Hashimoto et al. | ...... 29/603.14 |
| 2003/0209295 A1 | * | 11/2003 | Cooper et al. | .............. 148/311 |

FOREIGN PATENT DOCUMENTS

| | | |
|---|---|---|
| JP | 6089422 A | 3/1994 |
| JP | 08-096949 A | 4/1994 |
| JP | 6346202 A | 12/1994 |
| JP | 7003489 A | 1/1995 |
| JP | 8241503 A | 9/1996 |
| JP | 2821456 B1 | 8/1998 |
| JP | 2000-208355 A | 7/2000 |
| JP | 2002-134318 A | 5/2002 |
| JP | 2002280217 A | 9/2002 |

* cited by examiner

*Primary Examiner*—Kevin M. Bernatz
(74) *Attorney, Agent, or Firm*—Townsend and Townsend and Crew LLP

(57) ABSTRACT

At least one of lower and upper magnetic cores is composed of magnetic films each of which contains two or more elements of Co, Ni, and Fe, which are formed by electroplating in a plating bath with pH 2 or less, and which have a saturation magnetic flux density of 23,000 gauss or more.

8 Claims, 6 Drawing Sheets

(a)

(b)

(c)

(d)

MAGNETIC HEAD UTILIZING A CONIFE ALLOY WITH 60-80 WEIGHT PERCENT FE AND METHOD FOR PRODUCTION THEREFOR

CROSS-REFERENCE TO RELATED APPLICATIONS

This application claims priority to Japanese application No. 2002-319434, filed Nov. 1, 2002, the disclosure of which is incorporated by reference.

BACKGROUND OF THE INVENTION

1. Field of the Invention

The present invention generally relates to a magnetic head, typically used in a magnetic disk drive, and more particularly to a thin film magnetic head.

2. Description of Related Art

Recently, a recording medium with a higher coercive force is required, due to an ever-increasing recording density of a magnetic disk drive. Under such circumstances, the magnetic core of a write head is formed from a material with a high-saturation magnetic flux density (Bs) that generates a strong magnetic field.

One of the examples of the material having a high saturation magnetic flux density (Bs) is a CoNiFe alloy (Bs>1.7 T). This Bs value is greater than that of a $Ni_{45}Fe_{55}$ alloy (Bs: 1.6 T), which has been used in magnetic core materials. CoNiFe alloys are described in, for example, Japanese published patent application, JPA 6-89422, JPA 8-241503, JPA 6-346202, and JPA 7-3489. Further, Japanese Patent JP 2821456 describes a method for fabricating a magnetic film with high Bs values by plating in a plating solution that does not contain saccharin sodium. As another example, in Japanese published patent application, JPA 2002-280217, materials based on Co—Fe alloys is disclosed as having a high Bs value.

For a magnetic disk drive capable of high-density recording, a magnetic head with a magnetic core that generates a stronger magnetic field is required. Recently, forming a stable magnetic core with a thick film, using a material that has a high saturation magnetic flux density (Bs) is under study. Such material is required to generate a strong magnetic field that permits writing on a recording medium having a high coercive force.

However, even with the reported CoNiFe material we could not stably make a luster film with enough thickness by electroplating, because of white turbidity, bumps of the film surface. Also, Co—Fe two element series alloy did not have corrosion resistance.

Accordingly, what is needed is a magnetic head having a magnetic core that is capable of generating a stronger magnetic field, and at the same time having high corrosion resistance.

SUMMARY OF THE INVENTION

In a preferred embodiment, the invention provides a high corrosion resistant magnetic head, which can generate a strong magnetic field.

A preferred embodiment also provides a magnetic disk drive having such magnetic head.

In one embodiment, a magnetic head having a lower magnetic core and an upper magnetic core is provided. At least one of such core is composed of magnetic films each containing two or more elements selected from Co, Ni, and Fe. A magnetic layer disposed near a magnetic gap is a plated magnetic film, which contains Co, Ni, and Fe, with $20 \leq Co \leq 40$ wt % (wt % stands for percent by weight), $0 < Ni \leq 2$ wt %, and $60 \leq Fe \leq 80$ wt %. The magnetic film has a saturation magnetic flux density of 23,000 gauss or more. In the embodiment, the plated magnetic film is formed by electroplating in a plating bath having a pH of 2 or less.

This head is capable of generating a strong magnetic field for recording towards a narrowed track. Moreover, by implementing a magnetic film formed from a CoNiFe alloy, instead of the conventional CoFe alloy, an improvement in corrosion resistance will be achieved.

In addition, according to the embodiment, the plated film is formed in a plating bath containing saccharin sodium as a stress-relaxing agent.

The advantage of forming the plated film in a plating bath containing saccharin sodium is that it is possible to attain a thick film, with a thickness of 3 µm or more.

Moreover, in another preferred embodiment of the present invention, a magnetic disk drive is attained, which comprises a magnetic head and a magnetic medium having a coercive force of 4,000 Oe or more. Further, such magnetic disk drive contains a read head, and a write head comprising a lower magnetic core and an upper magnetic core, with at least one of them being formed from a material containing Co, Ni, and Fe, with $20 \leq Co \leq 40$ wt %, $0 < Ni \leq 2$ wt %, and $60 \leq Fe \leq 80$ wt %.

The magnetic disk drive constructed as mentioned above is capable of writing on a magnetic recording medium having a high coercive force, e.g., 4,000 Oe, owing to the magnetic head mentioned above.

Figure 1:
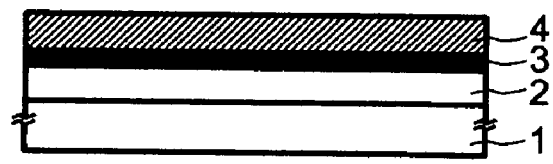
FIGS. 1(a) to 1(d) are diagrams showing a process flow for production of a magnetic core of a write head in a thin-film magnetic head.
Figure 1:
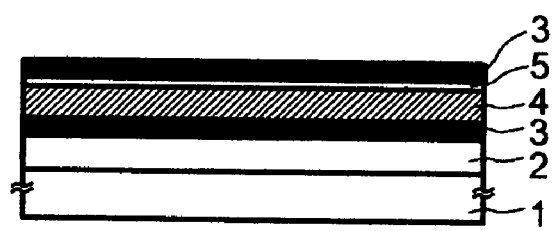
Figure 1:
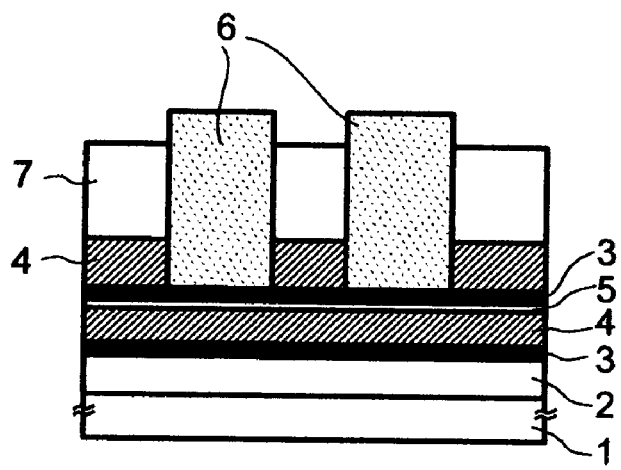
Figure 1:
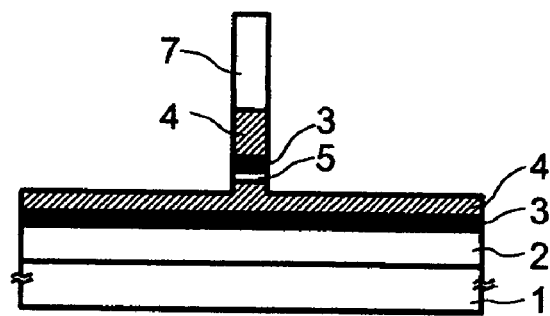

The following table includes a description of reference numerals.

| | |
|---|---|
| 1 | Substrate |
| 2 | 46NiFe film |
| 3 | Plated underlying film |
| 4 | CoNiFe plated film |
| 5 | Magnetic gap film |
| 6 | Resist film |
| 7 | 46NiFe film |

-continued

| 8 | Non-magnetic substrate |
| 9 | Lower magnetic shield |
| 10 | Giant magneto-resistive effect film |
| 11 | Magnetic domain control film |
| 12 | Electrode film |
| 13 | Conductor coil |
| 14 | Organic insulating layer |
| 15 | Magnetic disk |
| 16 | Motor |
| 17 | Magnetic head |
| 18 | Actuator |
| 19 | Voice coil motor |
| 20 | Spring |
| 21 | Guide arm |

DETAILED DESCRIPTION OF THE INVENTION

A detailed description is given below of a magnetic head and the process for production thereof according to the present invention.

The magnetic head according to the present invention is a thin-film magnetic head of the so-called write-read separate type. This magnetic head is characterized in that the write head (or inductive magnetic head) has a magnetic core which is formed according to the processes of the flow shown in FIG. 1.

As shown in FIG. 1(d), a lower magnetic core comprises a 46NiFe film 2, a CoNiFe underlying film 3, and a CoNiFe plated film 4, which are sequentially formed on a magnetic shield (not shown). The upper magnetic core, which faces the lower magnetic core, comprises a plated underlying film 3, a CoNiFe plated film 4, and a 46NiFe film 7, which are sequentially formed on a magnetic gap film 5.

In other words, each of the lower magnetic core and the upper magnetic core has a plated underlying film 3 and a CoNiFe plated film 4 formed thereon. The plated film 4 should preferably be composed of Co, Ni, and Fe, with $20 \leq Co \leq 40$ wt %, $0 < Ni \leq 2$ wt %, and $60 \leq Fe \leq 80$ w %. This composition is essential for the magnetic head to generate a magnetic field applicable to high-density recording. The underlying film 3 should be made of CoNiFe or CoFe so that the plated film 4 has good crystal properties for easy control of orientation.

The magnetic head having the magnetic core constructed as mentioned above is produced in the following manner.

Step (a): First, the 46NiFe film 2 is formed on a magnetic shield (not shown). Then, the CoNiFe underlying film 3 is formed by DC or RF sputtering with a CoNiFe alloy target in a sputtering chamber at a vacuum of $5 \times 10^{-5}$ Pa or less which is supplied with argon gas. An optional adhesion layer of non-magnetic metal with a thickness of about 5 nm may be formed. On the CoNiFe underlying film 3 is formed the CoNiFe plated film 4 by electroplating in a plating solution containing Co, Ni, and Fe ions and saccharin sodium as a stress relaxing agent, as specified in Table 1. The plating solution should be acidified so that pH<2.0, preferably $1.7 \leq pH \leq 1.9$. The plated film thus obtained has a composition of $Co_{33}Ni_1Fe_{66}$ (wt %).

Step (b): On the CoNiFe plated film 4 is formed the magnetic gap film 5, which is an insulating film of $Al_2O_3$ or $SiO_2$ in the form of single layer or multiple layers. Then, on the magnetic gap film 5 is formed the CoNiFe underlying film 3 by sputtering in the same way as mentioned above.

Step (c): A resist frame 6, which is used to form the upper magnetic core, is formed. The resist frame 6 is patterned into a desired shape, and then the CoNiFe plated film 4 and the 46NiFe plated film 7 are sequentially formed by plating. Incidentally, the 46NiFe film is used for either of the upper and lower magnetic cores in this step; however, the 46NiFe film may be replaced by an 80NiFe film, or the CoNiFe film as specified in the present invention may be used for both of the upper and lower magnetic cores. Also, to attain the object of the present invention, the thickness of the underlying film may range from 15 to 200 nm although it is 100 nm in this example.

Step (d): The resist and underlying film are removed, and trimming is performed so that the upper and lower magnetic cores have the prescribed track width.

TABLE 1

| Temperature of plating bath | 30° C. |
|---|---|
| PH | 1.9 |
| Current density | 9 mA/cm$^2$ |
| Co$^{++}$ | 3.3 g/l |
| Fe$^{++}$ | 6.3 g/l |
| Ni$^{++}$ | 1.7 g/l |
| Saccharin sodium | 1.5 g/l |

Figure 2:
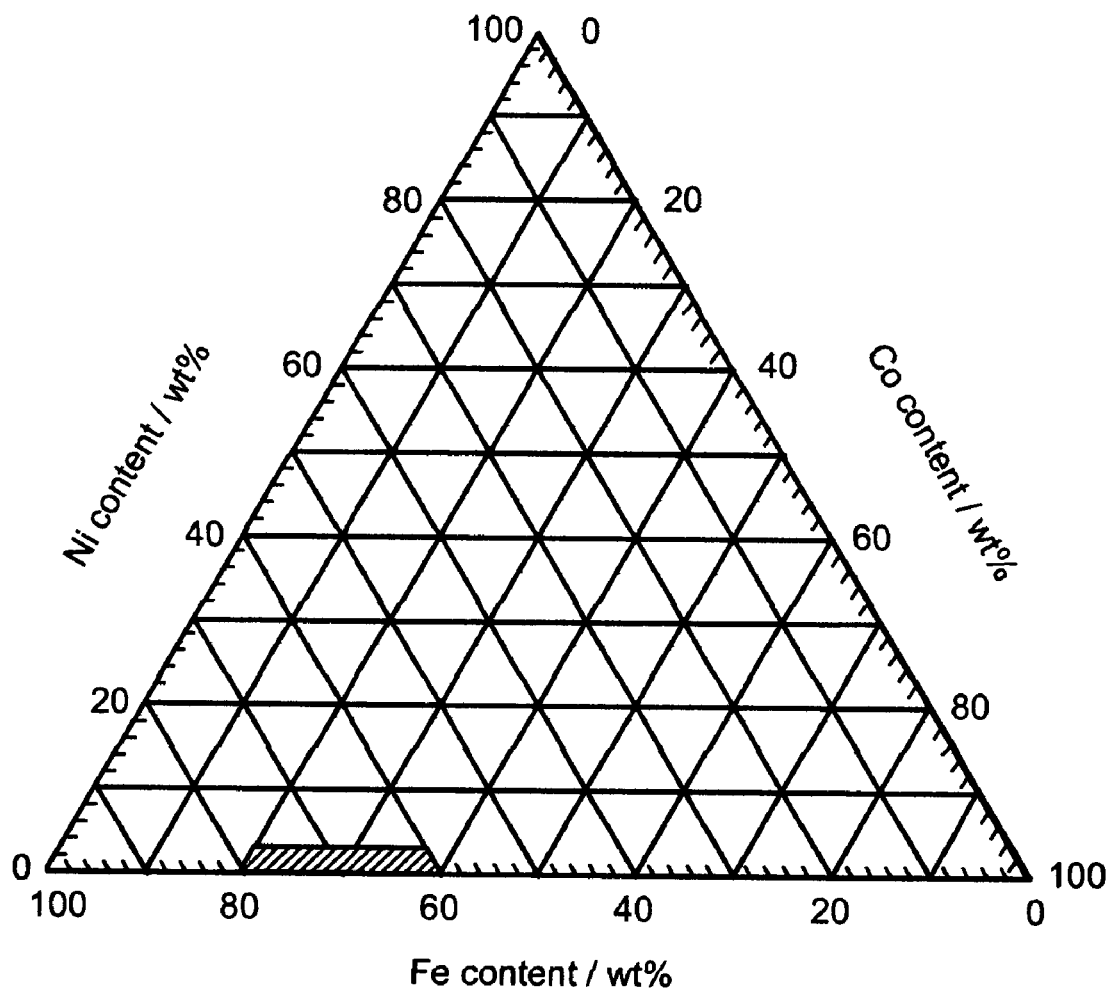
FIG. 2 is a triangular diagram showing the composition of a CoNiFe film obtained according to the present invention.
Figure 3:
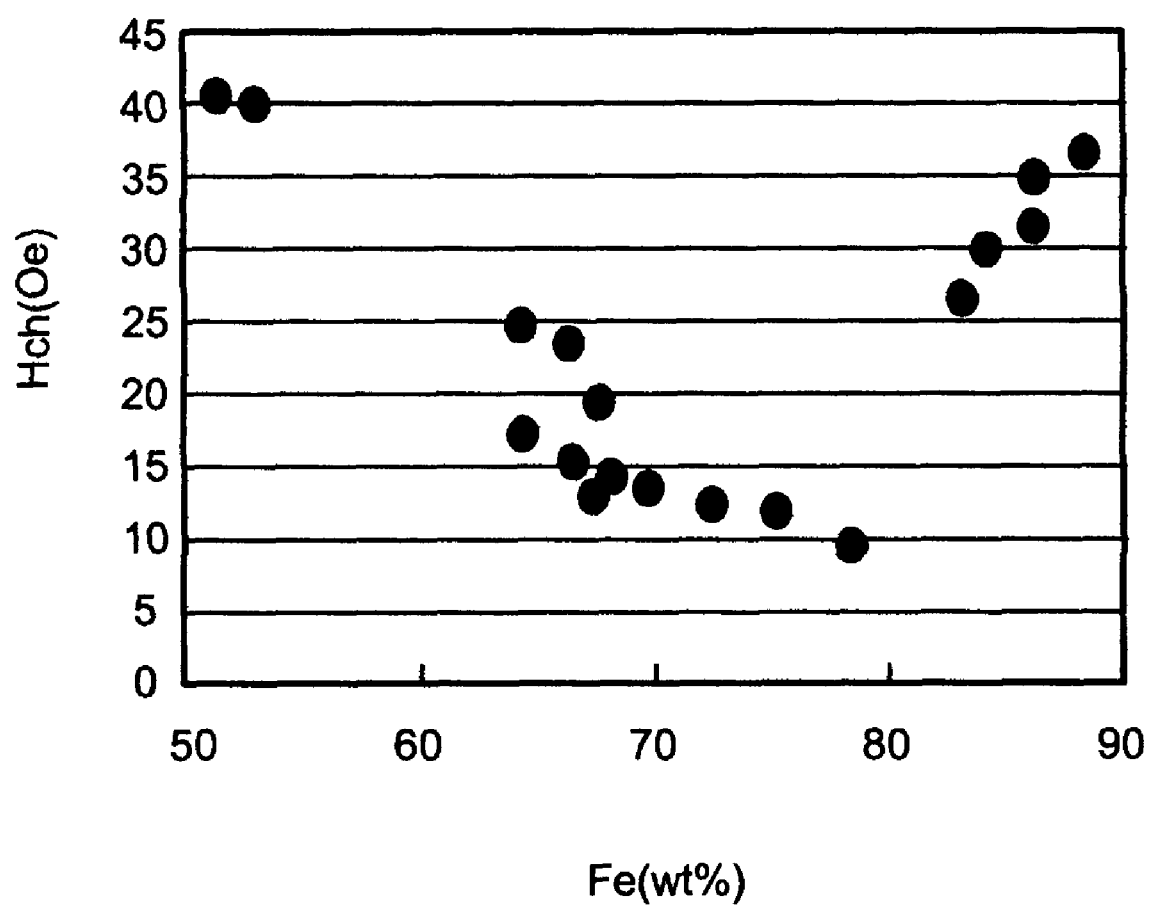
FIG. 3 is a diagram showing the coercive force of the CoNiFe film obtained according to the present invention.

The magnetic film varies in composition as shown in FIG. 2. With a composition of Co>40 wt % and Fe<60 wt %, or with a composition of Co<20 wt % and Fe>80 wt %, the resulting magnetic film-has a high coercive force as shown in FIG. 3, which leads to deteriorated properties in the soft magnetic film. Also, with a composition of Ni>2 wt %, the resulting magnetic film is poor in magnetic properties, that is, Bs<2.3 T. With a composition of Ni=0 wt %, the resulting magnetic film is poor in corrosion resistance. This is apparent from the measurement of corrosion potential, that is, a sample containing no Ni has a natural immersion potential which is low as compared with a sample containing 1 wt % Ni. Therefore, a nickel content more than 0 wt % is necessary.

The CoNiFe film with a composition of $20 \leq Co \leq 40$ wt %, $0 < Ni \leq 20$ wt %, and $60 \leq Fe \leq 80$ wt % as shown in FIG. 2 according to the present invention can be obtained by performing plating under the conditions shown in Table 2. The electroplating may employ either direct current or pulsed current.

TABLE 2

| Temperature of plating bath | 25–35° C. |
|---|---|
| PH | 1.7–2.0 |
| Current density | 3–100 mA/cm$^2$ |
| Co$^{++}$ | 2–10 g/l |
| Fe$^{++}$ | 5–20 g/l |
| Ni$^{++}$ | 0–3 g/l |
| Saccharin sodium | 0.5–2.0 g/l |

Figure 4:
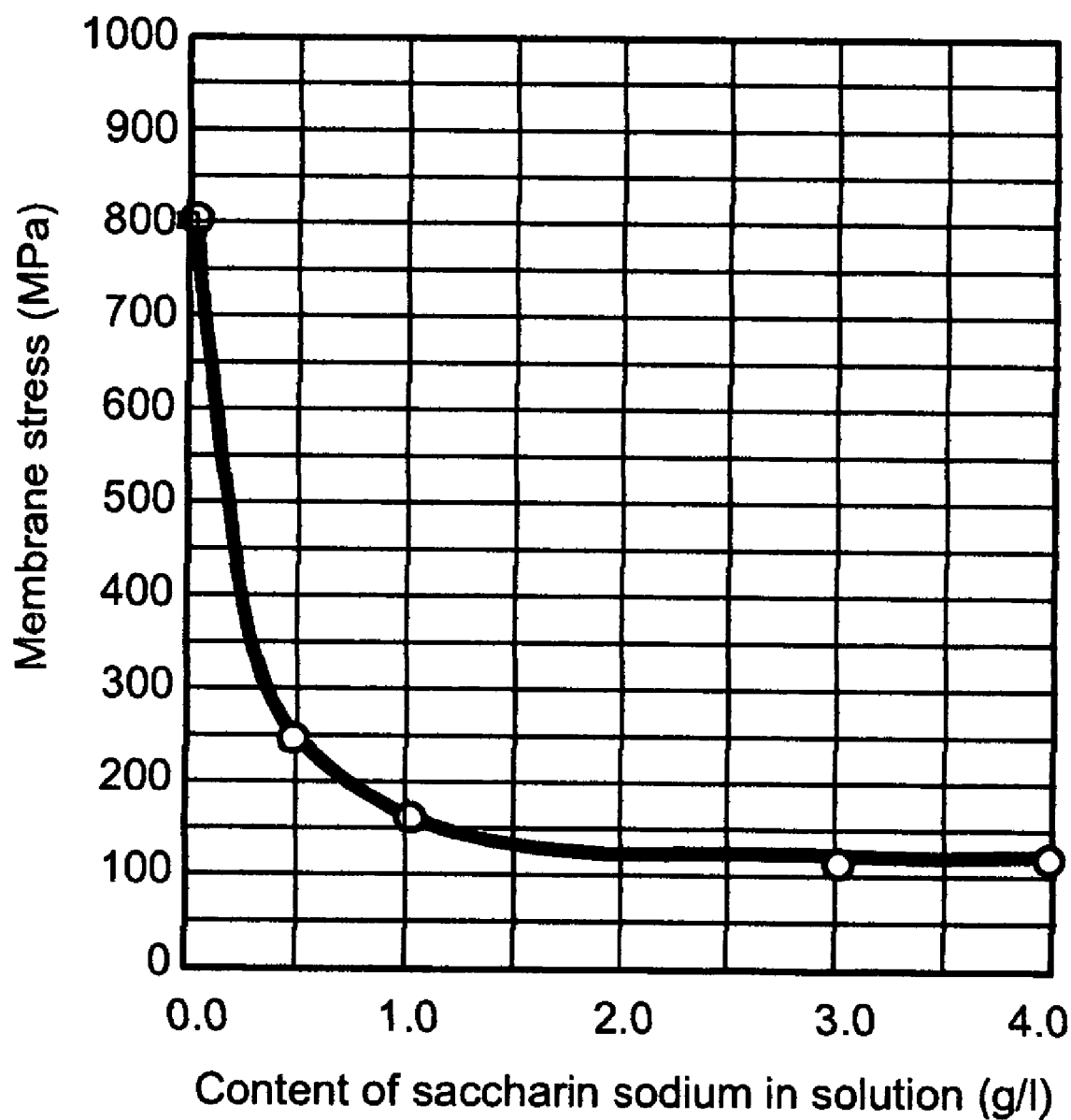
FIG. 4 is a diagram showing the relation between an amount of saccharin sodium added and stress in the resulting CoNiFe film.

As mentioned above, the present invention is characterized in that the CoNiFe or CoFe plated film is formed in a plating bath containing saccharin sodium as a stress-relaxing agent. Plating in this manner gives a plated film as thick as 3 μm or more. Moreover, as shown in FIG. 4, about 0.5 g/l of saccharin sodium added to the plating solution helps reduce the film stress to about 200 MPa. However, the addition of 2.5 g/l or more of saccharin sodium produces no additional effect. With an excess amount of saccharin sodium in the plating solution, the resulting film is poor in corrosion resistance on account of the increased sulfur content therein. Thus, the optimal amount of saccharin sodium is 0.5–2.0 g/l.

Figure 5:
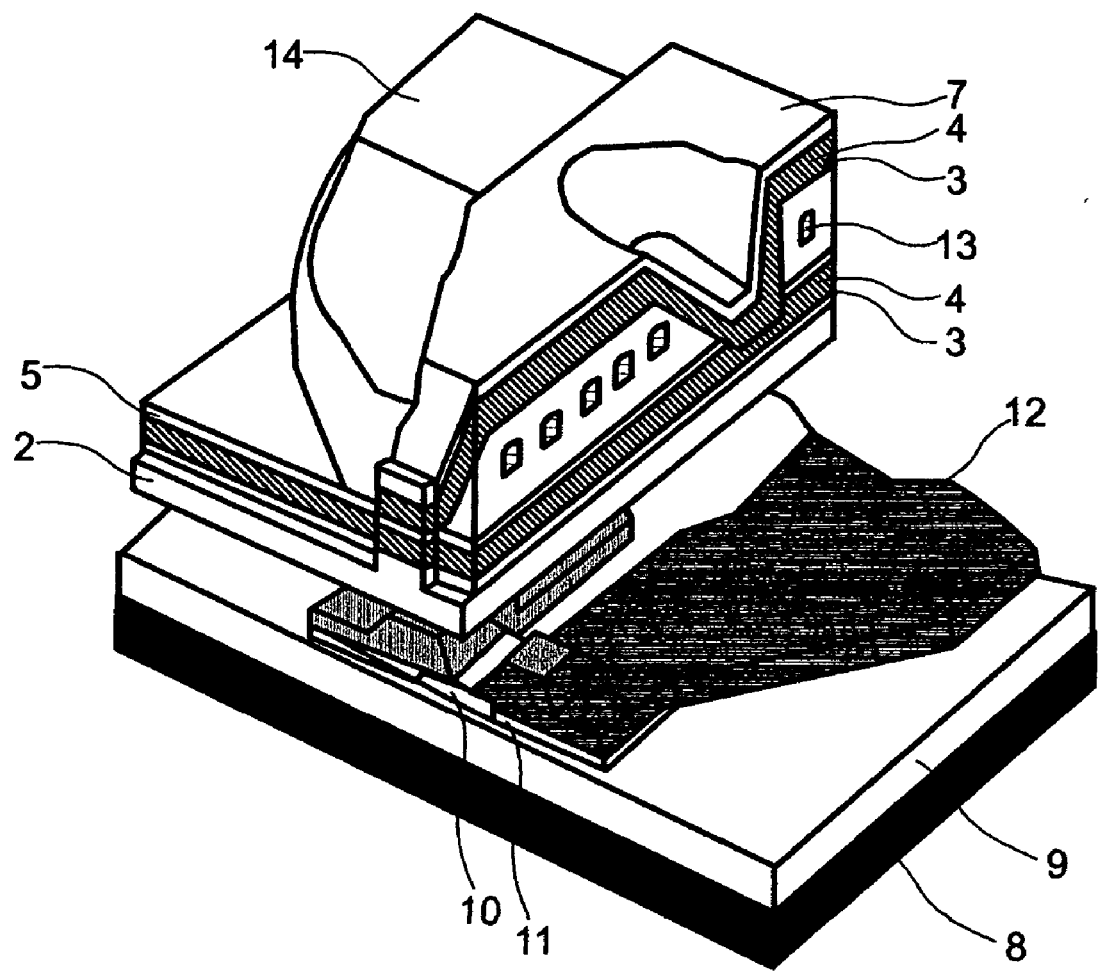
FIG. 5 is a schematic diagram showing a thin-film magnetic head of the present invention.

FIG. 5 is a partial sectional view of a thin-film magnetic head of write-read separate type which employs the write head having the above-mentioned underlying film 3 and plated film 4 in part of the upper and lower magnetic cores.

This magnetic head is produced in the following manner. First, on a non-magnetic substrate 8 are formed a lower magnetic shield film 9 and a lower magnetic gap film (not shown), and a MR or GMR sensor as a read element 10 is formed further thereon. Then, a magnetic domain control layer 11 and an electrode film 12 are formed, and the upper magnetic gap film and the upper magnetic shield film (not shown) are formed.

Then, a magnetic gap film between the read element and the write element is formed, and the lower magnetic core is formed thereon. Specifically, the 46NiFe film 2 is formed by plating, the CoNiFe underlying film 3 of a thickness of 100 nm is formed by sputtering, and the CoNiFe plated film 4 with a prescribed thickness is formed in a plating bath having pH<2.0. Good flatness may be achieved if an insulating film which is thicker than the plated film is formed and chemical mechanical polishing (CMP) is performed thereon. Then, the magnetic gap film 5 is formed. The CoNiFe underlying film 3 of 100 nm thick is formed by sputtering. A resist frame to form the upper magnetic core is formed, and the CoNiFe plated film 4 and the 46NiFe film 7 are sequentially formed by plating. The resist and underlying film are removed, and trimming is performed so that the upper and lower magnetic cores have a prescribed track width. Further, the coil 13 to apply a writing current and the organic insulating layer 14 are formed, and the 46NiFe film is formed by frame plating.

The thin-film magnetic head produced as mentioned above exhibits good writing characteristics; for example, the present inventors confirmed that this head is totally capable of writing on a magnetic medium having a coercive force of 4,000 Oe or more.

Figure 6:
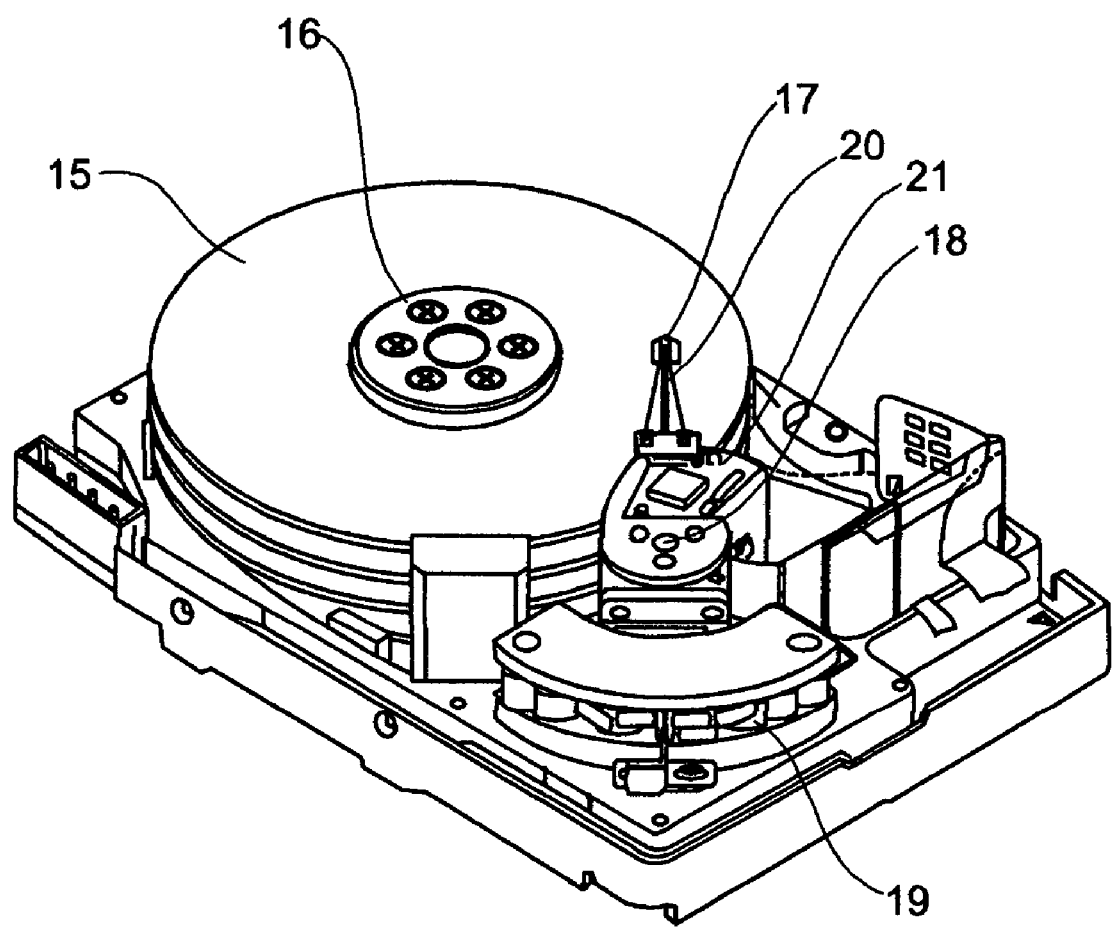
FIG. 6 is a schematic diagram showing a magnetic disk drive according to the present invention.

FIG. 6 shows the configuration of a magnetic disk drive provided with the above-mentioned thin-film magnetic head.

This magnetic disk drive comprises a magnetic disk 15 to record information, a motor 16 to turn the magnetic disk, a magnetic head 17 to write or read information on or from the magnetic disk, an actuator 18 for positioning the magnetic head 17 at a desired position on the magnetic disk, and a voice coil motor 19. The disk drive also has a guide arm 21 to which the magnetic head is attached and to which a spring 20 to stably maintain a submicron space for the magnetic head is fixed. The guide arm 21 is driven by the actuator and voice coil motor. In addition, the disk drive also comprises a magnetic disk rotation control system, a head position control system, and a write/read signal processing system, which are not shown.

As mentioned above, the magnetic head according to the present invention is constructed such that at least one of upper and lower magnetic cores of a write head is composed of magnetic films each of which contains two or more elements of Co, Ni, and Fe, and which are formed by electroplating in a plating bath with pH 2 or less. Moreover, a magnetic layer near a magnetic gap is a soft magnetic thin film containing Co, Ni, and Fe, with $20 \leq Co \leq 40$ wt %, $0 < Ni \leq 2$ wt %, and $60 \leq Fe \leq 80$ wt %, and having a saturation magnetic flux density of 23,000 gauss or more. Thus, the magnetic core capable of generating a strong magnetic field can invariably be formed and is applicable to high-density recording.

The process of the present invention permits the stable production of magnetic cores with thick films and hence provides a magnetic head applicable to high-density recording.

The magnetic disk drive of the present invention, which is provided with the above-mentioned magnetic head, is applicable to magnetic recording medium having a coercive force greater than 4,000 Oe and hence it achieves a high recording density.

What is claimed is:

1. A method for producing a thin-film magnetic head, comprising:
   forming a magnetic core having magnetic layers; and
   forming a magnetic gap film facing said magnetic core;
   wherein a magnetic layer, of said magnetic layers, is formed by electroplating in a plating bath having pH value of 2 or less and containing saccharin sodium to produce a thickness of 3 μm or more for said magnetic layer;
   wherein said magnetic layer contains Co, Ni, and Fe, with $20 \leq Co \leq 40$ wt %, $0 < Ni \leq 2$ wt %, and $60 \leq Fe \leq 80$ wt %, and has a saturation magnetic flux density of 23,000 gauss or more; and
   wherein said magnetic layer which is formed by electroplating is the nearest plated layer to said magnetic gap of said magnetic layers.

2. A method for producing a thin-film magnetic head as defined in claim 1, wherein said magnetic core includes an upper magnetic core and a lower magnetic core.

3. A method for producing a thin-film magnetic head as defined in claim 2, wherein either of said upper magnetic core or said lower magnetic core has said magnetic layer.

4. A method for producing a thin-film magnetic head, comprising:
   forming a read element;
   forming a first magnetic layer above said read element;
   forming a magnetic gap film above said first magnetic layer;
   forming a coil and insulating layer above said first magnetic layer;
   forming an underlayer for electroplating above said magnetic gap by sputtering;
   forming a second magnetic layer on said underlayer by electroplating in a plating bath having pH value of 2 or less and containing saccharin sodium to produce a thickness of 3 μor more for said second magnetic layer;
   wherein at least a first part of said second magnetic layer contains Co, Ni, and Fe, with $20 \leq Co \leq 40$ wt %, $0 < Ni \leq 2$ wt %, and $60 \leq Fe \leq 80$ wt %, and has a saturation magnetic flux density of 23,000 gauss or more.

5. A method for producing a thin-film magnetic head, according to claim 4,
   wherein at least a second part of said second magnetic layer contains NiFe which has a higher Ni percentage than said first part; and
   wherein said first part is closer to said magnetic gap compared to said second part.

6. A method for producing a thin-film magnetic head, comprising:
   forming a read element;
   forming a first magnetic layer above said read element;
   forming a magnetic gap film above said first magnetic layer;

forming a coil and insulating layer above said first magnetic layer;

forming a second magnetic layer above said magnetic gap;

wherein said first magnetic layer is formed by electroplating in a plating bath having pH value of 2 or less and containing saccharin sodium to produce a thickness of 3 μm or more for said first magnetic layer;

wherein at least a first part of said first magnetic layer contains Co, Ni, and Fe, with $20 \leq Co \leq 40$ wt %, $0 < Ni \leq 2$ wt % and $60 \leq Fe\ 80$ wt %, and has a saturation magnetic flux density of 23,000 gauss or more.

7. A method for producing a thin-film magnetic head, according to claim 6, wherein at least a second part of said first magnetic layer contains NiFe which has a higher Ni percentage than said first part, and wherein said first part is closer to said magnetic gap compared to said second part.

8. A method for producing a thin-film magnetic head, according to claim 6, further comprising:

forming a NiFe layer under said first magnetic layer.

* * * * *